(12) United States Patent
Sokol

(10) Patent No.: US 8,839,584 B2
(45) Date of Patent: Sep. 23, 2014

(54) DEVICE FOR CONNECTING AND LOCKING TWO BUILDING BOARDS, IN PARTICULAR FLOORING PANELS

(75) Inventor: Oliver Sokol, Rosenthal-Bielatal (DE)

(73) Assignee: Flooring Technologies Ltd., Pieta (MT)

(*) Notice: Subject to any disclaimer, the term of this patent is extended or adjusted under 35 U.S.C. 154(b) by 1445 days.

(21) Appl. No.: 12/204,195

(22) Filed: Sep. 4, 2008

(65) Prior Publication Data

US 2009/0064624 A1 Mar. 12, 2009

(30) Foreign Application Priority Data

Sep. 11, 2007 (DE) .......................... 10 2007 043 308

(51) Int. Cl.
*E04B 2/00* (2006.01)
*E04F 15/02* (2006.01)
*F16B 5/00* (2006.01)

(52) U.S. Cl.
CPC .......... *E04F 15/02* (2013.01); *E04F 2201/0523* (2013.01); *E04F 2201/0138* (2013.01); *F16B 5/0056* (2013.01); *E04F 2201/028* (2013.01)
USPC ...................................... 52/586.2; 52/586.1

(58) Field of Classification Search
USPC ............. 52/582.1, 586.1, 586.2, 592.1, 591.5
See application file for complete search history.

(56) References Cited

U.S. PATENT DOCUMENTS

| | | | | |
|---|---|---|---|---|
| 6,647,690 | B1 * | 11/2003 | Martensson | 52/601 |
| 7,451,578 | B2 * | 11/2008 | Hannig | 52/586.1 |
| 7,726,088 | B2 * | 6/2010 | Muehlebach | 52/582.1 |
| 2006/0236642 | A1 * | 10/2006 | Pervan | 52/578 |
| 2008/0236088 | A1 | 10/2008 | Hannig | |

FOREIGN PATENT DOCUMENTS

| | | |
|---|---|---|
| DE | 10 2006 011 887 | 7/2007 |
| EP | 1 415 056 | 7/2002 |
| EP | 1 420 125 | 3/2003 |
| WO | WO 2007/089186 A1 * | 1/2007 |
| WO | WO 2007079845 A1 * | 7/2007 |
| WO | 2007/089186 | 8/2007 |

* cited by examiner

*Primary Examiner* — Joshua J Michener
*Assistant Examiner* — Theodore Adamos
(74) *Attorney, Agent, or Firm* — Andrew M. Calderon; Roberts Mlotkowski Safran & Cole, P.C.

(57) ABSTRACT

The invention relates to a device for connecting and locking two building boards, in particular floor panels, on their longitudinal sides and/or transverse sides in the horizontal and vertical direction through an essentially vertical joining movement. The building boards have a top side and an underside. On their lateral edges (I, II) to be connected to one another are provided with profiles corresponding to one another, and a locking element is provided in the profile of the first building board, which locking element has an inner end and an outer end and is inserted with the inner end in a groove of the first building board, and which interacts with a locking depression provided in the profile of the second building board such that the two building boards are automatically locked in the vertical direction with the joining movement. The locking element is embodied in a foldable manner at a point distant from its outer end to form a locking finger, and is embodied in a foldable manner at a point distant from its inner end to form a closure. On the lateral edge (I) of the first building board between the top side and the groove a projection springing out outwards is provided. At the end of the joining movement the locking element is folded at both points and the locking finger with the outer end engages on the underside of the projection on the first building board and with its other end engages in the locking depression of the second building board. The closure thereby bears against the locking surface of the locking depression, whereby both building boards are locked in the vertical direction.

16 Claims, 2 Drawing Sheets

DEVICE FOR CONNECTING AND LOCKING TWO BUILDING BOARDS, IN PARTICULAR FLOORING PANELS

CROSS REFERENCE TO RELATED APPLICATIONS

This present application claims priority under 35 U.S.C. §119 to German Patent Application No. 10 2007 043 308.7, filed on Sep. 11, 2007, the contents of which are incorporated in their entirety herein by reference.

BACKGROUND OF THE INVENTION

1. Field of the Invention

The invention relates to a device for connecting and locking two building boards, in particular floor panels, on their longitudinal sides and/or transverse sides in the horizontal and vertical direction through an essentially vertical joining movement, wherein the building boards have a top side and an underside, on their lateral edges to be connected to one another are provided with profiles corresponding to one another, and a locking element with a locking projection is provided in the profile of the first building board, which locking element has an inner end and an outer end and is inserted with its inner end in a groove of the first building board, and which interacts with a locking depression provided in the profile of the second building board such that the two building boards are automatically locked in the vertical direction with the joining movement.

2. Discussion of Background Information

A device of this type is known, e.g., from EP 1 415 056 B1 and makes it possible to join two floor panels on their transverse sides. On the longitudinal sides the panels are connected by a tongue and groove profile milled out of the lateral edges. The tongue of the panel to be newly laid is thereby inserted into the groove of a panel already laid and the panel to be newly laid is then pivoted down onto the subfloor. On the transverse side the device makes it possible to simply join the panels by insertion in the vertical direction with a final light pressing in, wherein the locking projection then latches into the locking groove. The locking at the transverse side in the horizontal direction takes place through a hook-shaped profile of the lateral edges, which is milled out of the solid material. In the vertical direction the two panels are locked by the plastic insert that is inserted firmly in the profile of the one building board and has a laterally projecting resilient lip, which latches into an undercut that is made in the profile of the second building board (of the opposite lateral edge).

The connection of the plastic insert to the profile of the first panel is carried out by a web running in the horizontal direction that is inserted into a groove made horizontally in the lateral edge. The locking lip projecting from the locking element is compressed by the panel to be newly laid during the joining movement and springs out again when it overlaps with the undercut. The spring lip must be very elastic so that the automatic engagement occurs securely. The more elastic the embodiment of the spring lip, the lower the forces absorbable by it in the opposite direction (so-called pull-out forces), which act against the joining direction and release the connection. Commercial floor panels have a thickness of 6 to 12 mm. The groove to be made laterally in the profile of the lateral edge, in which groove the plastic insert is attached, must consequently be milled in a width of 2 to 3 mm and a depth of approx. 5 mm. The 1.5 to 3 mm thick plastic insert must then be placed into the groove. Both steps must be carried out at high machine speeds, which is not unproblematic. Through the thickness of the plastic insert, the vertical locking is limited to laminate floors with thicknesses of greater than 10 mm, which further restricts the applicability of the locking system.

When a high elasticity is necessary for the locking, on the one hand the material selection is very restricted, which can lead to increased costs or to increased production expenditure. High spring forces of the locking elements are then necessary if a secure and durable locking is to be ensured. Since this is generally the case with high-quality connections, the forces and deformations generated are usually correspondingly high. For laminate floor panels, a base board of a wood material, in particular HDF or MDF, is used. If high forces act on a laminate, such as HDF, on small areas lengthwise to the layer direction, damage occurs very quickly, in particular in tapered areas. The profile shapings of the profile of the base board can be very stressed by the high spring forces, and chips on the base material occur not infrequently. This can mean that connections do not lock completely or at all. Furthermore, the mostly large deformations of the locking elements often lead to a weakening, in particular when the deformation exceeds the elastic range or the deformation lasts for a longer period. This can lead to reduced restoring forces of the locking elements and thus to only incomplete blocking.

SUMMARY OF THE INVENTION

Based on this problem, the device described above is to be improved.

To solve the problem, a generic device is characterized in that the locking element is embodied in a foldable manner at a point distant from its outer end to form a locking finger, and is embodied in a foldable manner at a point distant from its inner end to form a closure, that on the lateral edge of the first building board between the top side and the groove a projection springing out outwards is provided, that at the end of the joining movement the locking element is folded at both points and the locking finger with the outer end engages on the underside of the projection on the first building board and with its other end engages in the locking depression of the second building board and the closure thereby bears against the locking surface of the locking depression, whereby both building boards are locked in the vertical direction.

Through this embodiment a secure locking is possible without high spring forces being necessary. The locking is carried out by a form closure via the locking finger and the closure angled thereto.

Preferably the locking element is embodied in cross section in an essentially L-shaped manner. When the outer end of the locking element is prestressed with respect to the inner end, the locking finger bears against the projection of the first building board before the joining movement. It is thus in a defined position, so that the movements of the locking element in the folding during the joining movement are reproducible.

If the locking element used is not prestressed, the locking finger can also be adhered to the projection projecting from the lateral edge to adjust a reproducible position also with a pressure-sensitive adhesive. Naturally, the adhesive forces must be only so high that the locking finger is released from the lateral edge through the joining movement without the profile being damaged thereby.

The locking element can comprise plastic or metal.

The inner end of the locking element is preferably clamped in the groove. It can also particularly preferably be adhered in the groove.

BRIEF DESCRIPTION OF THE DRAWINGS

An exemplary embodiment of the invention is described in more detail below with the aid of a drawing. The drawings show.

DETAILED DESCRIPTION OF THE PRESENT INVENTION

Figure 1:
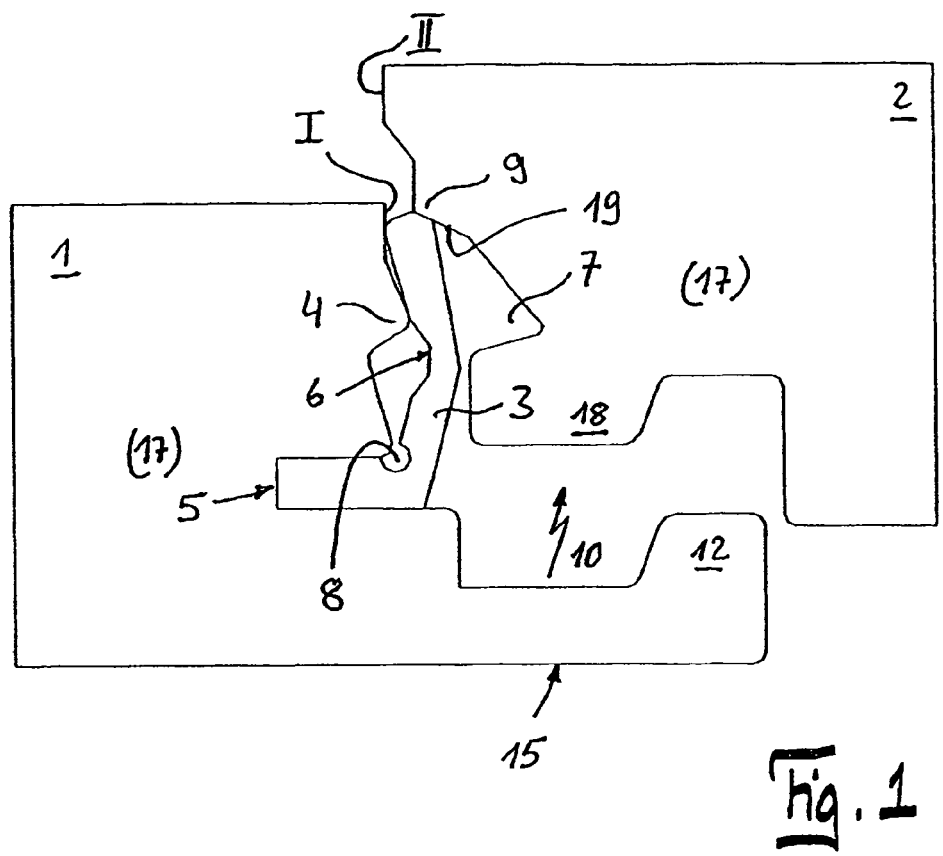
FIG. 1 shows two building boards at the joint in partial view with the locking element inserted at the start of joining.

The invention is to be explained for floor panels that can be connected to one another via the device according to the invention at their longitudinal sides as well as at their transverse sides or also at only one side. The device is provided to connect panels on their transverse sides. The longitudinal sides are preferably connected by angling a new panel into a panel already lying on the floor and subsequent lowering onto the subfloor, as is shown in detail in EP 1 415 056 B1. The joining movement on the transverse side then takes place essentially in the vertical direction.

As can be seen from the drawing, the panels 1, 2 are provided on their lateral edges I, II with hook-shaped profiles 10, 11 corresponding to one another. Even though a first and a second panel are spoken of here, each panel 1, 2 is of course profiled identically and the profiles 10, 11 correspond to one another. The panel 1 is profiled starting from its top side 14 and the panel 2 is profiled starting from its underside 15. The profiles 10, 11 are embodied in a step-shaped manner so that a groove 13 open at the top with a horizontal groove 5 extending in the core 17 is embodied in the profile 11 of the first panel 1. The profile 10 on the panel 2 forms a shoulder 18 projecting in the direction of the underside 15 and a groove 7 made transversely in the lateral edge II, which groove is embodied in an essentially triangular manner in cross section and serves as a locking depression.

The locking element 3 comprising plastic or metal is embodied in an essentially L-shaped manner and with its short leg 3a, which begins on its inner end 3'', placed into the groove 5. The longer leg 3b, 3c bears with its outer end 3' against the projection 4 springing outwards from the lateral edge I. The locking element 3 can be folded at the points labeled 6 and 8, so that a locking finger 3c is formed starting from the outer end 3' up to the foldover point 6 and a closure 3b is formed from the foldover point 6 up to the foldover point 8.

The locking element 3 can be inserted in the panel 1 at the factory or placed into the groove 5 manually during laying.

Figure 2:
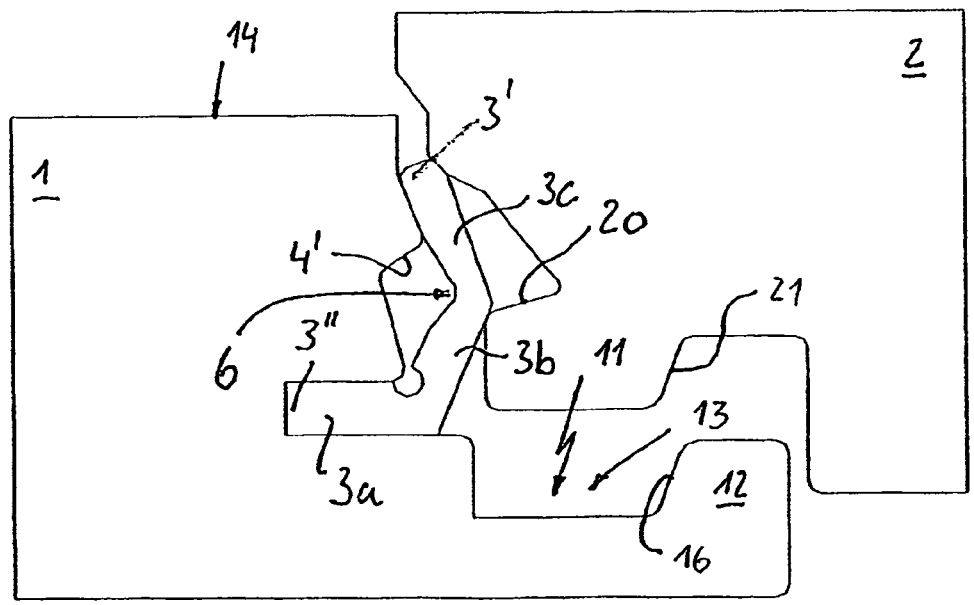
FIG. 2 shows a representation according to FIG. 1 at the start of the locking.
Figure 3:
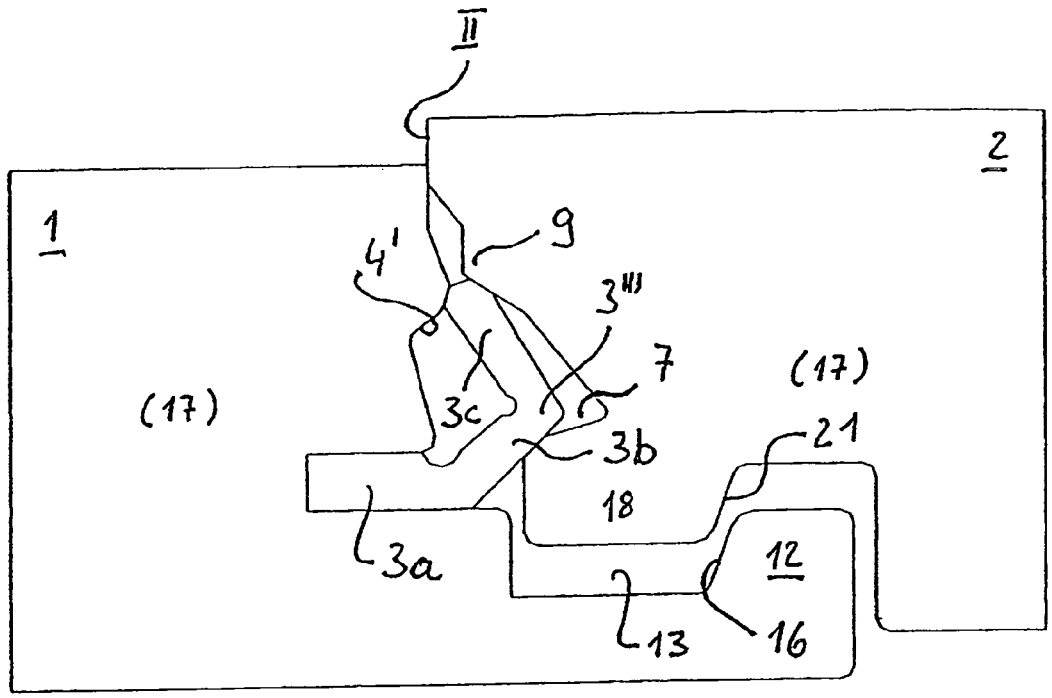
FIG. 3 shows a representation according to FIG. 1 with the connection of the building boards having progressed further.
Figure 4:
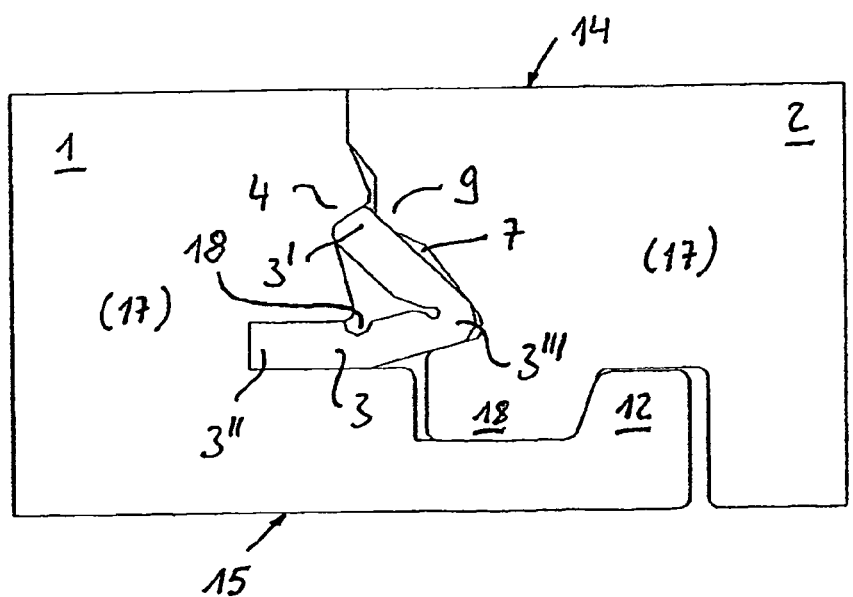
FIG. 4 shows a representation according to FIG. 1 with complete connection and locking of the two building boards.

When the panel 2 is lowered to the panel 1, as FIG. 1 shows, the underside 19 of the projection 9 shallowing out outwards on the upper end of the groove 7 contacts the lateral edge II on the outer end 3' of the locking element 3. With the further lowering movement the projection 9 presses the locking finger 3c on the projection 4 embodied in the lateral edge I of the panel 1. At the same time, the other end of the locking finger 3c bears against the shoulder 18 in the area of the locking surface 20 of the groove 7 (FIG. 2). The locking element 3c thus begins to fold in at the foldover point 6. With the further lowering movement the projection 9 presses the locking finger 3c past the projection 4 until the tip of the outer end 3' bears against the underside 4' of the projection 4. The locking element 3c now also folds about the foldover point 8. When the locking finger 3c bears against the underside 4' of the projection 4, the end 3''' of the locking finger 3c opposite the outer end 3' engages in the locking groove 7. At the same time the closure in the area of the end 3''' bears against the locking surface 20 of the groove 7 and a positive locking is achieved between the building boards 1 and 2. Through the reproducible folding movement of the locking element 3, it is possible to achieve an abutting of the lateral edges I, II free of a difference in height at the joint.

The locking in the horizontal direction is carried out via the hook-shaped profile 10, 11. The shoulder 18 is supported in the groove 13. The wall 21 on the shoulder 18 and the wall 16 on the shoulder 12 bear against one another.

The invention claimed is:

1. Building boards with a locking element, wherein the locking element comprises: an essentially L-shaped element having a short leg and a long leg, a first foldover point is provided between the short leg and the long leg such that the short leg and the long leg are foldable towards each other, a second foldover point is provided along the long leg such that an upper portion of the long leg and a lower portion of the long leg is foldable with respect to one another and the upper portion is foldable towards the short leg.

2. The building boards with the locking element according to claim 1, wherein the essentially L-shaped element is metal.

3. The building boards with the locking element according to claim 1, wherein the essentially L-shaped element is plastic.

4. The building boards with the locking element according to claim 1, wherein the lower portion of the long leg is positioned between the upper portion of the long leg and the short leg.

5. The building boards with the locking element according to claim 1, wherein the upper portion of the long leg is a locking finger.

6. The building boards with the locking element according to claim 1, wherein the locking element is foldable at the first foldover and the second foldover to form a locking finger starting from an outer end of the long leg to the first foldover and a closure is formed from the first foldover up to the second foldover.

7. The building boards with the locking element according to claim 6, wherein a first of the building boards comprises a horizontal groove extending in a core and a projection embodied in a lateral edge such that the short end engages in the horizontal groove and the long end bears with its outer end against the projection springing outwards from the lateral edge.

8. The building boards with the locking element according to claim 7, wherein a second of the building boards comprises a groove extending in a core in a lateral edge of the second building board such that a foldover point of the second foldover engages in the groove of the second building board.

9. A device for connecting and locking two building boards on their longitudinal sides and/or transverse sides in a horizontal and vertical direction through an essentially vertical joining movement, the building boards comprise a top side and an underside, on their lateral edges (I, II) to be connected to one another are provided with profiles corresponding to one another, and wherein the device comprises: a locking element provided in the profile of the lateral edge (I) of the first building board, the locking element has an inner end and an outer end and is inserted with the inner end in a groove of the first building board, and interacts with a locking depression provided in the profile of the lateral edge (II) of the second building board such that the building boards are automatically locked in the vertical direction with the joining movement, wherein the locking element is embodied in a foldable manner at a point distant from the outer end to form a locking finger, and in a foldable manner at a point distant from the inner end to form a closure, a projection springing out outwards is provided on the lateral edge (I) of the first building board between the top side and the groove, at an end of the joining movement the locking element is folded at both points and the locking finger with the outer end engages on an underside of the projection on the first building board and with an other end engages in the locking depression of the second building board and the closure thereby bears against the locking surface of the locking depression, whereby both of the building boards are locked in the vertical direction.

10. The device according to claim 9, wherein the locking element is embodied in cross section in an essentially L-shaped manner.

11. The device according to claim 9, wherein the outer end is prestressed with respect to the inner end and the locking finger bears against the projection of the first building board before the joining movement.

12. The device according to claim 9, wherein the locking element comprises plastic.

13. The device according to claim 9, wherein the locking element comprises metal.

14. The device according to claim 9, wherein the inner end is clamped in the groove.

15. The device according to claim 9, wherein the inner end is adhered in the groove.

16. The building boards with the locking element according to claim 9, wherein the other end is at the point that is distant from the inner end.

* * * * *